United States Patent [19]
Witheridge et al.

[11] Patent Number: 5,197,047
[45] Date of Patent: Mar. 23, 1993

[54] AUTOMATIC TRANSMISSION SYSTEM MULTI-CHANNEL SCHEDULING

[75] Inventors: Neil Witheridge, Glebe; Tapas K. Debray, Seven Hills, both of Australia

[73] Assignee: Sony (Australia) Pty. Limited, North Ryde, Australia

[21] Appl. No.: 769,648

[22] Filed: Oct. 2, 1991

[30] Foreign Application Priority Data

Oct. 23, 1990 [AU] Australia ................................. 2987

[51] Int. Cl.$^5$ ........................... H04B 1/20; H04N 5/76
[52] U.S. Cl. ........................................ 369/4; 369/34; 358/335; 358/341; 364/191; 360/14.1
[58] Field of Search .................. 369/4, 2, 30, 32, 34, 369/36, 54; 360/14.1, 14.2, 14.3; 358/335, 341, 343, ; 364/191, 143, 145, DIG. 2

[56] References Cited

U.S. PATENT DOCUMENTS

4,605,973  8/1986  Von Kohorn ..................... 358/335
4,694,490  9/1987  Harvey et al. ..................... 358/84 X

*Primary Examiner*—Paul M. Dzierzynski
*Assistant Examiner*—Ali Neyzari
*Attorney, Agent, or Firm*—Alvin Sinderbrand; William S. Frommer

[57] ABSTRACT

A method of merging playlists each for a single channel for simultaneous transmission over a network by a multi-channel automatic transmission system (1) which replaces the functions previously performed in a network studio (100) by a number of single channel automatic transmission systems (111, 112, 113 ...) corresponding to a number of regional transmitters (101, 102, 103 ...). Any proposed merging is checked before the merged playlist is completed. The checking takes the form of two sequentially applied tests. The first test is that the required number of cassette changes be less than or equal to a calculatable maximum number. The second test is that for each channel, for each event other than the first event on the playlist, the sum of the cumulative thread, cue and pre-roll times and the elevator movement times be less than or equal to the sum of the total event durations including the event being checked less the total of the previous event durations for that channel.

4 Claims, 4 Drawing Sheets

VCR AND ELEVATOR ACTIVITIES vs TIME SCALE

AUTOMATIC TRANSMISSION SYSTEM MULTI-CHANNEL SCHEDULING

The present invention relates to automatic transmission systems and, in particular, to multi-channel transmission of audio/video material from a single automatic transmission system.

Although the present invention will be described in relation to television, the invention is not limited thereto and can also find application in radio broadcasting.

BACKGROUND ART

With the advent of television networking, and in particular broadcasting of a common core program from a network studio to several regions or regional transmitters, a need has arisen for the transmission from a single studio of different sequences of play items simultaneously. This need arises in the following way. The network transmits a core programme of entertainment to transmitters servicing each region of the network simultaneously. However, each region of the network is based around a major population centre and its hinterland. As a result, the viewers of each region constitute separate markets for some types of advertisements. Thus during commercial breaks, local advertisers wish to have their advertisement displayed within their own region, but not also displayed within any of the other regions in the network.

As a consequence of this need, it is necessary for different advertisements to be displayed in each of the different regions in the network. Since each advertisement is not of an identical duration, it is necessary for the advertisements to be carefully scheduled in order that the commercial break at each station be of identical duration so that all commercial breaks can commence and finish simultaneously.

Hitherto, this requirement for simultaneous, but different, commercial breaks has been met by the network studio having a single channel automatic transmission system (ATS) for each region which arranges for the sequential transmission of each of the advertisements which is to be displayed during the commercial break.

However, such automatic transmission systems are relatively expensive pieces of equipment (A$250,000–A$1,000,000) including as they do an elaborate cartridge storage and retrieval system, and at least two and typically four VCR's which play respective cassettes in the sequence of advertisements.

In order to reduce overall costs in the network, it would be desirable to have a multi-channel automatic transmission system which could simultaneously broadcast different sequences of advertisements for each of the regions in the network during a network wide commercial break. Thus the central network studio need possess fewer ATS's to service the number of regions.

OBJECT OF THE INVENTION

It is an object of the present invention to reduce the abovementioned network costs by the provision of a method of scheduling a multi-channel play list for a multi-channel automatic transmission system.

SUMMARY OF THE INVENTION

In accordance with the present invention there is disclosed a method of merging a plurality of playlists each for a single channel and of equal length into a single playlist for simultaneous multi-channel transmission, said method comprising the steps of determining the maximum number of cassette changes able to be performed during the playlist length and checking that the required number of cassette changes is less than or equal to said maximum number, and, if so, checking that for each event for each channel other than the first event, the sum of the cumulative thread, cue and pre-roll times, and the elevator movement times is less than or equal to the sum of the total event durations including the event being checked less the total of the previous event durations for that channel.

BRIEF DESCRIPTION OF THE DRAWINGS

An embodiment of the present invention will now be described with reference to the drawings in which.

DETAILED DESCRIPTION

Figure 1:
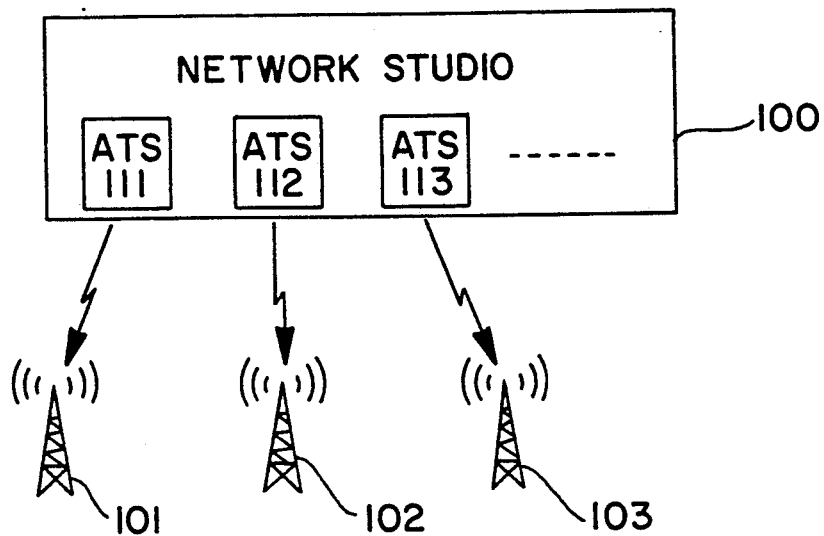
FIG. 1 is a schematic representation of the prior art arrangement where a single network studio services a number of regions.

FIG. 1 illustrates the prior art arrangement in which a single network studio 100 services a number of regions each of which has its own local regional transmitter 101, 102, 103, and so on. The program for each of the regional transmitters 101–103 is determined by a corresponding single channel automatic transmission system (ATS) 111, 112, 113 and so on. As each ATS costs A$250,000–A$1,000,000, the capital costs associated with the central network studio 100 have hitherto been very high.

Figure 2:
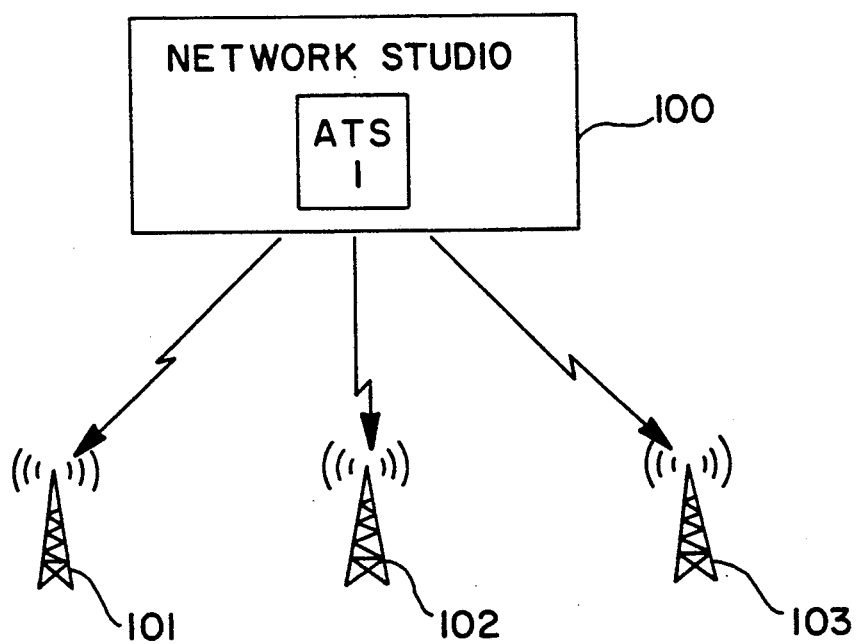
FIG. 2 is a representation similar to FIG. 1 but for the arrangement of the preferred embodiment.

The corresponding arrangement in accordance with the preferred embodiment is illustrated in FIG. 2. Here it will be seen that the central network studio 100 utilizes only a single multi-channel ATS 1 which is able to determine the program for each of the regional transmitters 101–103 simultaneously.

Figure 3:
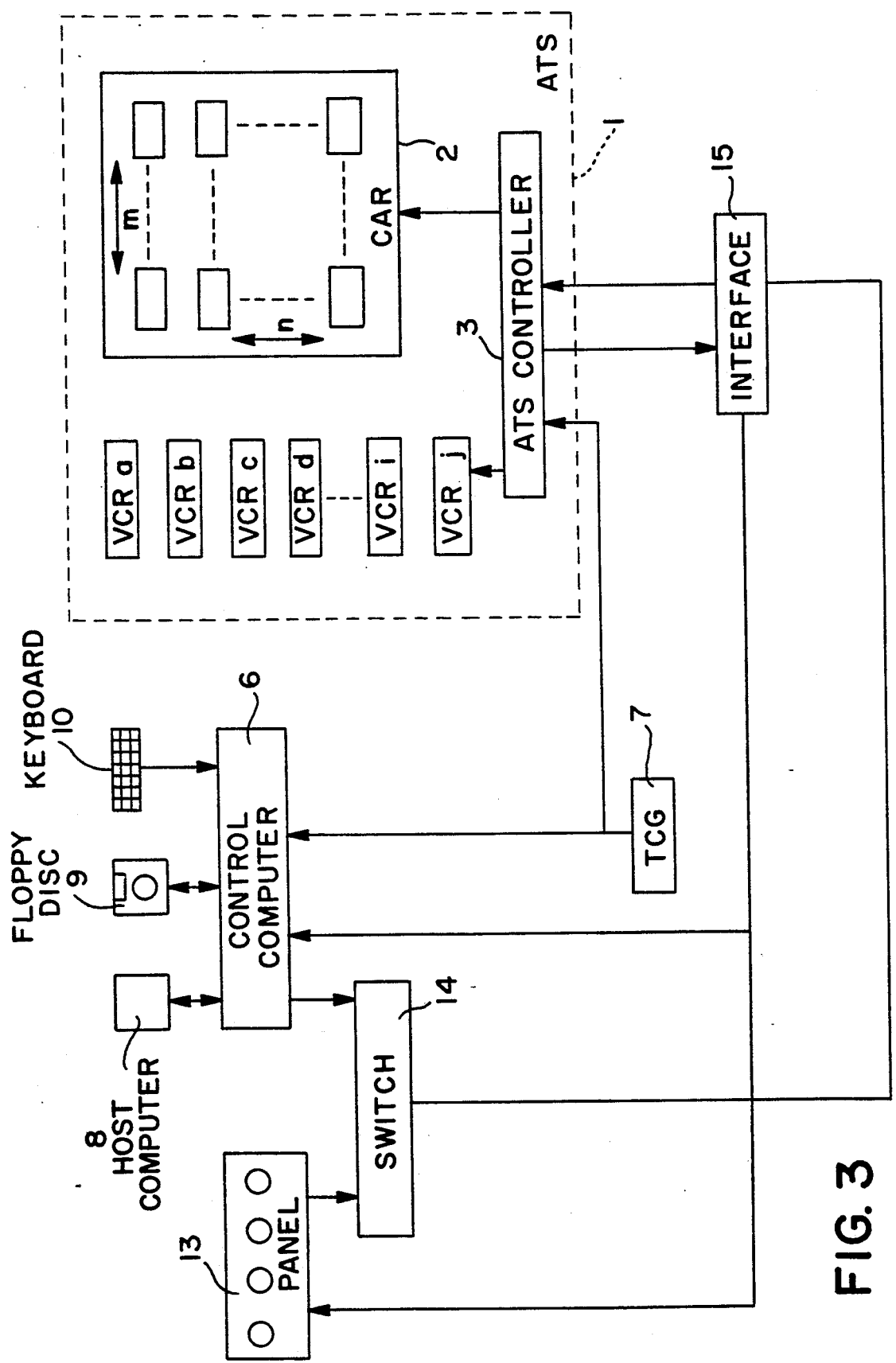
FIG. 3 is a block diagram of the apparatus which enables multi-channel operation by an automatic transmission system (ATS)

Referring now to FIG. 3, the automatic transmission system (ATS) 1 of the preferred embodiment is illustrated schematically. Included within the ATS 1 is a cartridge access and retrieval (CAR) device 2 which is essentially conventional and consists of an array of n rows and m columns of cartridge storage locations and a transport mechanism (not illustrated). The transport mechanism is able to retrieve a cartridge from a nominated storage position and enter it into one of a number of VCRs, VCRa–VCRj in order to enable the VCR to play the contents of the cartridge. At the end of the cartridge playing time, the cartridge is able to be removed from the VCR and returned to its storage location by the transport mechanism.

A conventional ATS has only a small number of VCRs (typically at least two such as VCRa and VCRb). Normally four VCR's would be used but the minimum number of VCR's which must be present is that which will guarantee uninterrupted transmission of advertisements of a fixed minimum duration. These VCR's play consecutive cartridges in a sequence of advertisements.

Since the ATS 1 of the preferred embodiment is intended for multi-channel operation there are further VCR's required to provide uninterrupted transmission assuming the same minimum advertisement duration. These VCRs are indicated as VCRa to VCRi. The CAR device 2 and VCR's are under the control of an ATS controller 3.

In order to arrange for the necessary control and sequencing of the ATS 1, a control computer 6 (which preferably takes the form of a small personal computer), and a time and control code generator (TCG) 7 are provided. This time code generator is accurate to at least the time of one frame of a television signal and provides a synchronizing signal to both the control computer 6 and the ATS controller 3. In addition, the control computer 6 is able to receive inputs from any one or more of a host computer 8, a floppy disc 9 and a keyboard 10.

A push button panel 13 is also provided for manual control of multi-channel transmission. This is achieved by the connection of both the push button panel 13 and the computer 6 to respective inputs of a switch 14. The output of the switch 14 is connected to the ATS controller 3 via an interface 15 which converts the parallel output of the switch 14 into a serial input for the ATS controller 3. Should the ATS controller 3 include a parallel input/output port, the interface 15 would not be required.

In addition, the interface 15 receives data from the ATS controller 3 and sends it to both the control computer 6 and push button panel 13 for the purpose of logging and display of the current state of the ATS 1 on the push button panel 13, for example by tally signals.

Figure 4:
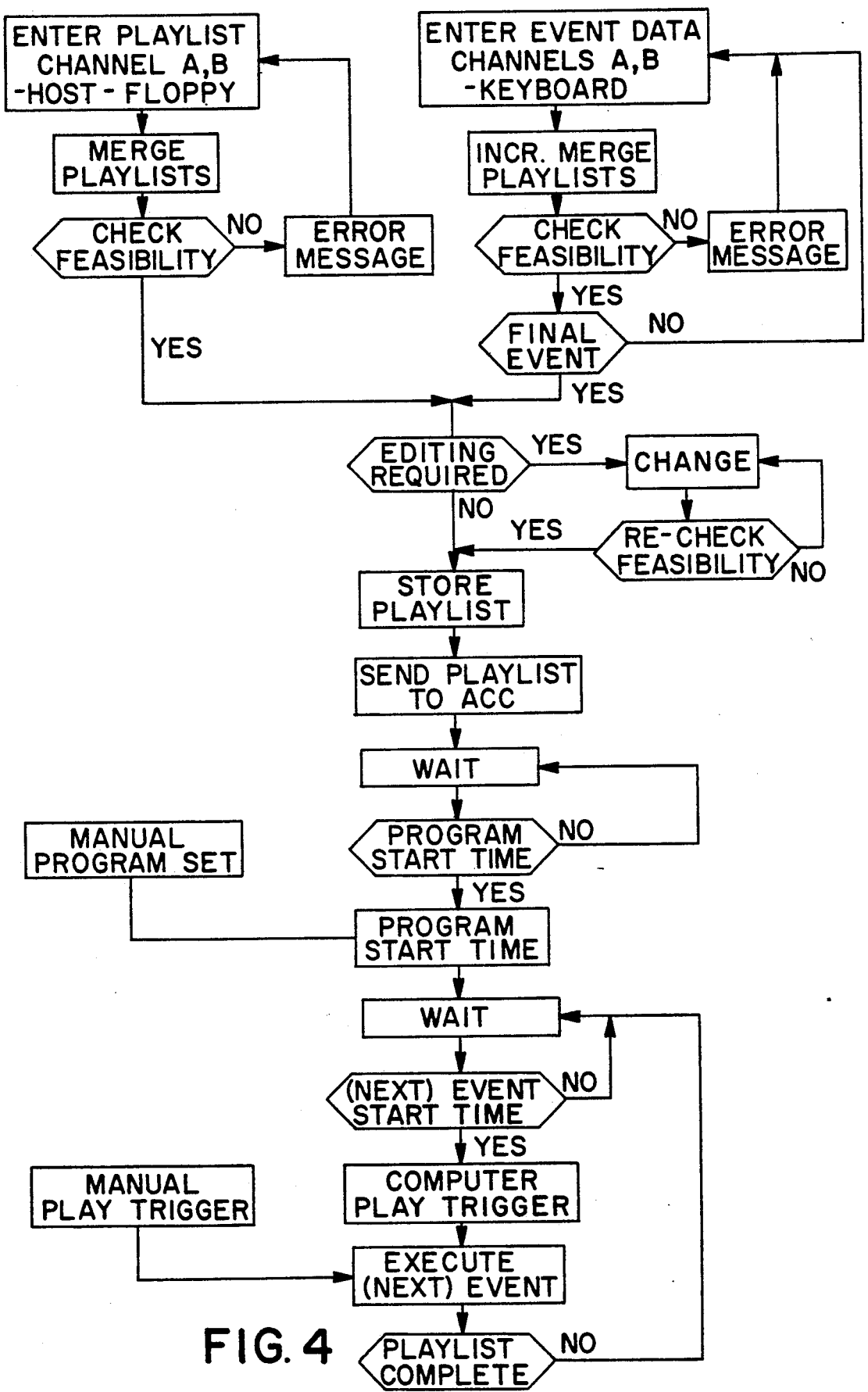
FIG. 4 is a flowchart showing the sequence of operations for the necessary scheduling.

Turning now to FIG. 4, a flowchart of the scheduling arrangements is illustrated. The flowchart is of generally Y-shaped configuration.

The top righthand arm of the Y deals with the keyboard entry of data, and the upper lefthand arm of the Y of the flowchart deals with the host computer or floppy disk transfer of data. This data in both instances relates to the playlist for each commercial break for each of the channels or stations of the network. The entry via the keyboard 10 allows the incremental checking on an event by event basis as the playlist data is entered. It is necessary to determine that the sum of the play durations of each play item of the sequence of each channel, is identical to the total duration of the playlist. That is to say it is not possible for channel A to play two commercials each of 90 seconds duration whilst channel B, for example, plays two 60 second commercials and one 90 second commercial since the commercial break on channel B would then be of a different duration from the commercial break on channel A.

Most importantly, since the CAR device 2 of FIG. 3 has a finite access time for the removal and retrieval of cartridges, it is also necessary to ensure that the sum of the access time and cassette movement time(s) of each play item is less than the duration of the proceeding play items in the sequence so as not prevent uninterrupted transmission of the sequence of advertisements for each channel.

Figure 5:
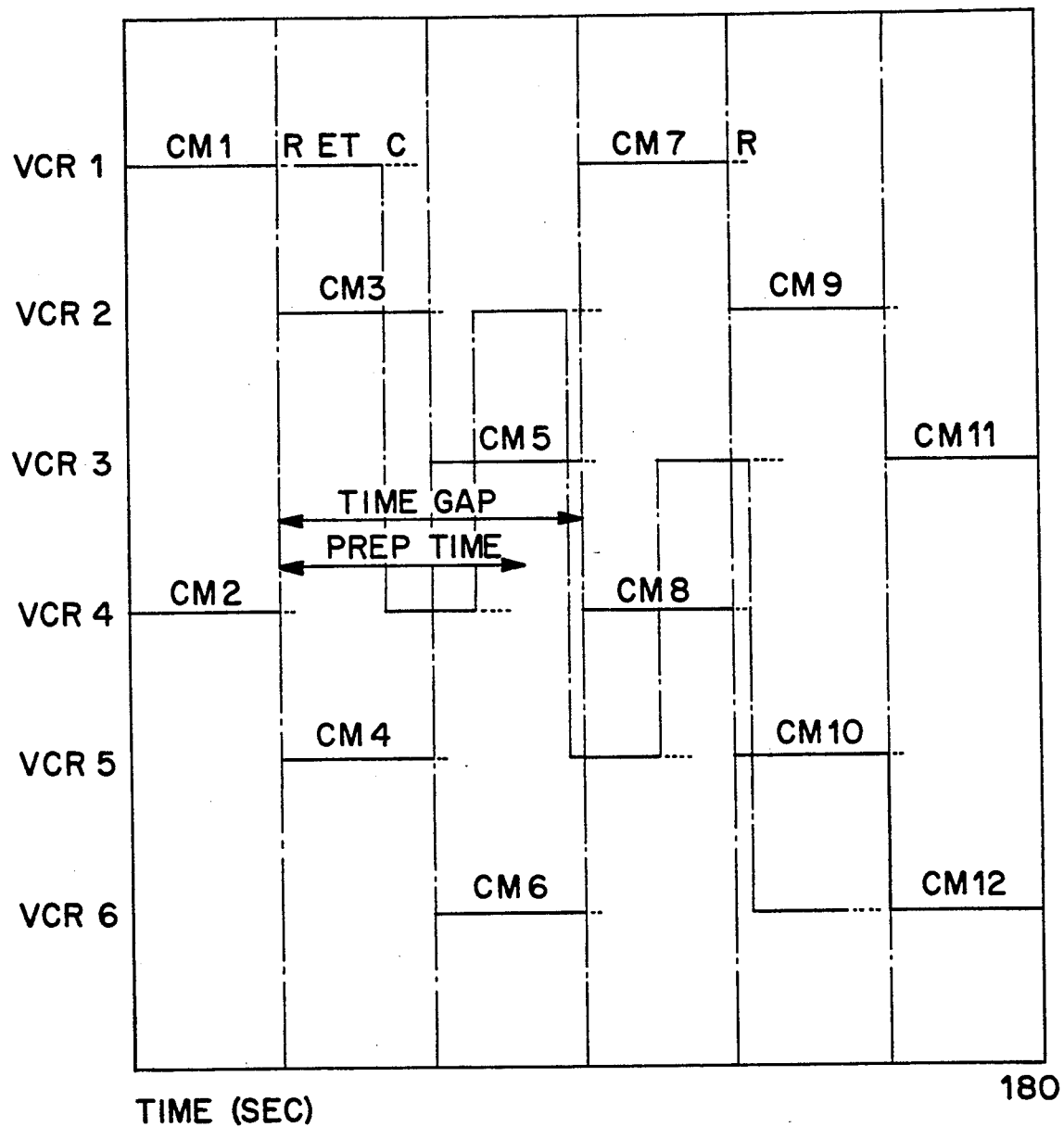
FIG. 5 is a timing diagram.

In order to understand this further requirement which must also be met, reference is made to FIG. 5 which is a timing diagram which sets out the VCR activity during a commercial break and also that of the transport mechanism of the CAR device 2.

In FIG. 5, unemphasized horizontal line segments represent commercial playback, dotted small segments (R) represent the sum of post-roll time + rewind time + reject time, bold line segments (ET) represent elevator cassette movement time for changing the cassette, and bold broken line segments (C) represent the sum of thread time + cue time + pre-roll time.

The following assumptions are made:
1) The time slot (T) is an amount of time into which the whole commercial break is hypothetically graduated. That is, the minimum possible duration of a single advertisement.
2) The commercial break is hypothetically calibrated in terms of N time slots of T such that CM Break = N.T seconds. The commercial units or advertisement durations of channel A and channel B belonging to the same group of time slots are arranged to be of equal duration.
3) VCR1, VCR2 and VCR3 are used for channel A, VCR4, VCR5 and VCR6 are used for channel B.
4) If two channels are supported by the prior art ATS machine maintaining assumption (2) and (3), channel B is very likely to be delayed due to belated service by the elevator (or transport mechanism).
5) Variation of Elevator Service Time (ET) around average elevator service time is negligible.
6) In mathematical expressions,
   $CM_n$ represents the duration of the advertisement or commercial unit An odd subscript means it is an event for channel A.

An even subscript means it is an event for channel B.

If under some conditions, it can be guaranteed that B channel is not delayed, it can be practically guaranteed that under those conditions, dual channel operation can be achieved.

In order to derive the constraints which will guarantee that all channel B events commence at the correct time, the worst case should be analyzed to guarantee that the worst case is still feasible.

The worst case situation occurs when all commercial units are of a duration of one time slot. That is, all the advertisements are of the minimum possible duration. Under these conditions the transport mechanism elevator is under maximum load.

FIG. 5 depicts this worst case situation as the commercial units are each equal to the length of the time slot. A more relaxed playlist would contain some corresponding commercial units of channel A and channel B as multiples of the time slot (T).

In order to start a CM unit at the correct time, its preparation time must be less than or equal to the available time gap.

Considering the worst case, in order to guarantee correct commencement of the 4th CM unit, the following inequality must be observed.

$$R + 2ET_{max} + C_1 \leq 2T \qquad (1)$$

Similarly for the 5th CM unit $$R + 4ET_{max} + C_2 \leq 3T \qquad (2)$$

and for the 6th CM unit $$R + 6ET_{max} + C_3 \leq 4T \qquad (3)$$

In general therefore, in order to guarantee correct commencement of the (i+1)th CM unit, the following inequality must hold true for $(3 \leq i \leq N)$.

$$R + 2(i+2)ET_{max} + C_{i-2} \leq (i-1)T \qquad (4)$$

i.e. $ET_{max} \leq \dfrac{(i-1)T - (R + C_{i-2})}{2(i-2)}$

So, $\lim\limits_{i \to \infty} ET_{max} \leq \lim\limits_{i \to \infty} \dfrac{(i-1)T - (R + C_{1-2})}{2(i-2)}$ Hence $ET_{max} \leq \dfrac{T}{2}$ Therefore, in order to support the worst case, the minimum commercial unit duration should be greater than or equal to twice the maximum elevator service time. If the maximum elevator service time is 15 sec, then a worst case with all commercial units of 30 sec. duration can be guaranteed for dual channel transmission.

If a commercial break is calibrated in terms of N time slots (T) then the maximum No of cassette changes (n), which can be achieved in (N−1) timeslots is given by $R + n\, ET_{max} + C_{N-3} \leq (N-2)T$ i.e. $n\, ET_{max} \leq (N-2)T - (R + C_{N-3})$ i.e. $n \leq \dfrac{(N-2)T - (R + C_{n-3})}{ET_{max}}$ i.e. $n \leq \dfrac{CMBreak - (R + C_{N-3})}{ET_{max}} - \dfrac{2T}{ET_{max}}$ i.e. $n \leq \dfrac{CMBreak - (R + C_{N-3})}{ET_{max}} - 4$ by using $T = 2ET_{max}$ Hence $n_{max} = \dfrac{CMBreak - (R_{min} + C_{min})}{ET_{max}} - 4$     (5)

For a dual channel playlist, the maximum no. of allowable cassette changes for a given commercial break can be computed using equation (5) above. From the dual channel playlist the required no. of cassette changes for the same commercial break can also be determined.

For all dual channel commercial breaks, the following inequality must be maintained. Required No. of cassette changes ≦ Maximum Allowable No. of Cassette changes.

Inequality (4) is actually valid under the assumptions made in the beginning of this analysis. In a real case, commercial units for both channels can be of different length. The following inequalities provide the same property as that of inequality (4) for such a case.

For channel A, in order to start (i+1)th commercial unit correctly (i≧3), if n(i) is the total No. of cassette changes which must be done to support both channels within the time gap then, $R_{max} + n(i)ET_{max} + C_{max} \leq \sum\limits_{j=1}^{j=i} CM_{2j-1} - \sum\limits_{j=1}^{j=i-2} CM_{2j-1}$    (6A)

Similarly, for channel B, in order to start (i+1)th commercial unit correctly (i≧3), if n(i) is the total No. of cassette changes which must be done to support both channels within the time gap then, $R_{max} + n(i)ET_{max} + C_{max} \leq \sum\limits_{j=1}^{j=i} CM_{2j} - \sum\limits_{j=1}^{j=i-2} CM_{2j}$    (6B)

In a dual channel playlist, indexing through i, of the different required n(i) values for every commercial event can be found. By applying inequalities (6A) and (6B) for every commercial event on a per channel basis, whether the constraint is maintained, and thus whether it is feasible to start the event correctly, can be determined.

Equation (5) and inequality (6A) and (6B) provide a mathematical basis for the development of a two pass check to determine the feasibility of a dual channel playlist.

This theory can be demonstrated with the help of three simple playlists.

| EVENT | PLAYLIST 1 CHANNEL | DURATION |
|---|---|---|
| CM01 | A | 15 |
| CM02 | B | 15 |
| CM03 | A | 30 |
| CM04 | B | 30 |
| CM05 | A | 10 |
| CM06 | B | 10 |
| CM07 | A | 10 |
| CM08 | B | 10 |
| CM09 | A | 15 |
| CM10 | B | 15 |
| CM11 | A | 10 |
| CM12 | B | 10 |

The duration of playlist 1 is 90 sec.

First check to see if the required no. of cassette change for this 90 sec. commercial break is within its maximum allowable limit.

If the max. value of ET is taken as 10 sec, and the minimum value of (R+C) is taken as 20 sec (which are quite realistic values), the maximum no. of allowable cassette changes for this commercial break is found to be equal to 3 using equation (5)[((90−20)/10)−4=3].

Playlist 1 requires 6 cassette changes during the commercial break which is greater than the maximum allowable limit of 3. Hence the first pass of the check rejects playlist 1 as not being a feasible playlist.

| EVENT | PLAYLIST 2 CHANNEL | DURATION |
|---|---|---|
| CM01 | A | 30 |
| CM02 | B | 30 |
| CM03 | A | 15 |
| CM04 | B | 15 |
| CM05 | A | 15 |
| CM06 | B | 15 |
| CM07 | A | 30 |
| CM08 | B | 30 |

Playlist 2 requires 2 cassette changes which is lower than the maximum allowable limit for the same commercial break. Hence the first pass of the check will accept playlist 2. However, in the second pass of the check, inequality (6A) fails to satisfy for i=3. Similarly, inequality (6B) fails for i=3. Hence the second pass rejects playlist 2 as not being a feasible playlist.

| PLAYLIST 3 | | |
|---|---|---|
| EVENT | CHANNEL | DURATION |
| CM01 | A | 15 |
| CM02 | B | 15 |
| CM03 | A | 30 |
| CM04 | B | 30 |
| CM05 | A | 30 |
| CM06 | B | 30 |
| CM07 | A | 15 |
| CM08 | B | 15 |

Playlist 3 requires two cassette changes which is lower than the maximum allowable limit for the same commercial break. Hence the first pass of the check accepts this playlist as a valid one. In the second pass, both inequality (6A) and (6B) holds true for i=3 (taking the maximum realistic value of (R+C) as 40 sec.). As the (i+1)th CM unit is the last CM unit for both channels in the playlist for i=3, the second pass of the check terminates by accepting playlist 3 as a valid or feasible playlist.

When the above-described procedures have been carried out, a complete schedule of the intended sequence of advertisements is then available and is stored in the control computer 6. The time code generator 7 provides the timing information necessary to enable the control computer 6 to determine that the commercial break start time has occurred. When this happens, the control computer 6 via the switch 14 and interface 15 triggers the ATS controller 3 thereby commencing the programme simultaneously on each channel. The sequence of events for each channel stored in the control computer 6 then takes place with synchronization being provided by the time code generator 7. As a consequence, the core programme is transmitted to all the channels or stations in the network and at each commercial break, which occurs simultaneously on all channels, a different sequence of advertisements is broadcast for each channel.

In order to cater for various day-to-day operational situations which arise in broadcasting, it is desirable to enable manual instructions to be inserted via the push button panel 13 which can, for example, freeze an image, or result in transmission of a stand-by channel identification image. This may be necessary because of a defect in a cartridge which only becomes apparent when the cartridge actually malfunctions, or because of last minute withdrawal of a previously scheduled advertisement.

The foregoing describes only one embodiment of the present invention and modifications, obvious to those skilled in the art, can be made thereto without departing from the scope of the present invention.

We claim:

1. A method by which a plurality of playlists representing respective sequences of events of video/audio signals stored on respective cassettes, and in which each of said events has a respective time duration and the total time duration for each of the sequences is the same as for the other sequences, are transmitted as a single combined playlist by a multi-channel automatic transmission system operative to simultaneously broadcast each of said sequences of events over a respective transmission channel, said method comprising the steps of:

determining, from said playlists, the number of times said cassettes need to be changed in said multi-channel automatic transmission system;

determining, from said playlists, the maximum number of times said cassettes are allowed to be changed; and combining said playlists if the required number of times said cassettes are to be changed for said playlists is less than or equal to the maximum allowable number of times said cassettes are allowed to be changed, and, if, for each of the events to be broadcasted over each of the respective channels other than the first event, the sum of thread, cue and pre-roll times and the time required for the respective changes is less than or equal to the total event time durations including the current event less the total of the previous event time durations for the respective channel.

2. A method according to claim 1, wherein said maximum allowable number of times said cassettes may be changed, is determined by summing minimum times for post-roll, rewind eject, to the minimum times for the thread, cue and pre-roll, subtracting the summed result from said total time duration of the sequence, dividing the subtracted result by the maximum time required for one of said changes and subtracting 4 therefrom.

3. A method according to claim 2, wherein the thread time, cue time, pre-roll time, post-roll time, rewind time, eject time and the time required for one of said changes are based on performance characteristics of cassette access and retrieval means included in said multi-channel automatic transmission system.

4. A method according to claim 1, wherein said playlists are combined into said single combined playlist prior to being supplied to said multi-channel automatic transmission system.

* * * * *